Patented June 5, 1945

2,377,840

UNITED STATES PATENT OFFICE 2,377,840

LIQUID COATING COMPOSITIONS

John J. Healy, Jr., Brookline, Mass., assignor to Monsanto Chemical Company, St. Louis, Mo., a corporation of Delaware No Drawing. Application February 13, 1942, Serial No. 430,756

15 Claims. (Cl. 106—192)

This invention relates to liquid coating compositions, and more particularly to lacquer compositions containing addition agents capable of markedly flatting or dulling their appearance.

Flatting agents which have been commonly used in the past include such substances as clay, magnesia, magnesium carbonate, asbestine, and the like. Although these materials have been fairly useful in the flatting of drying oil varnishes, they are highly unsatisfactory in nitrocellulose lacquer or like coating compositions. Thus, they not only have a marked tendency to cake and settle in the lacquer vehicle, but cause haziness or milkiness in clear films and a change of color (shade) or color value (intensity) in pigmented films. Moreover, they have a deleterious effect on the general film properties of the lacquer, as shown by loss of tensile strength, increase in brittling and early failure in the mandrel test.

It is accordingly a primary object of the present invention to provide a flatting agent which possesses exceptional flatting powers in lacquer compositions.

A further object of the invention is to provide a flatting agent of the type described which does not tend to cake or settle in the lacquer vehicle.

A further object of the invention is to provide a flatting agent which may be added to clear lacquer compositions in sufficient quantity to produce pronounced flatting effects with substantially no change in the transparency of the composition.

A further object of the invention is to provide a flatting agent which may be added to pigmented lacquer compositions in sufficient amount to produce pronounced flatting effects with substantially no impairment of the color or color value of the composition.

A still further object of the invention is to provide a highly flatted lacquer composition which substantially retains the general film properties which it possessed prior to being flatted.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The present invention is in general carried out by mixing with the lacquer composition varying amounts of a silica gel having an alcohol as the liquid or continuous phase, or at least as the major portion of the continuous phase. The gels which it is proposed to use in the above manner are preferably prepared by first preparing an aquagel by reacting sodium silicate with a mineral acid, such as sulfuric or hydrochloric acid and washing out the resulting sodium salt with water after which the water in the gel is replaced or largely replaced by washing the gel one or more times with a suitable alcohol.

The alcogels prepared in the above manner usually contain from 10 to 15% by weight of silica. However, it is possible to prepare commercially by the above method gels containing anywhere from 1 to 20% by weight of silica. The gels are added to the lacquer in amounts sufficient to supply from 1 to 20% of silica based on the solids in the lacquer. The amount of silica which is required in the film depends upon the use which is to be made of the particular lacquer being treated. Regardless of the amount employed or the use made of the lacquer, however, the flatting efficiency of the alcogels described herein is definitely superior to that of previously known flatting agents.

The alcohol employed in the preparation of the above gels should preferably contain not more than three carbon atoms, as these alcohols, which include methyl, ethyl, normal propyl and isopropyl alcohols, are thoroughly water-miscible and hence are capable of readily replacing substantially all of the water in the original aquagel. Alcohols containing four or more carbon atoms mostly require either the use of a mutual solvent for the alcohol and water, or the use of more than one replacement operation, and in general are not so desirable for the purposes of this invention.

It is usually preferable to employ anhydrous alcohol or an alcohol containing a relatively small amount of water, such as for example commercial ethyl alcohol, which contains about 93% alcohol by weight. It is possible, however, to obtain good results with alcohols containing as much as 20% by weight of water, as such amounts of water do not appear to have any harmful effects on most lacquers.

In order to obtain a lacquer film of adequate smoothness it is usually necessary to grind the gel into the lacquer. This may be accomplished in various ways, but is preferably done by first preparing a so-called base grind, and then stirring the base grind into sufficient amounts of the lacquer vehicle to make the finished lacquer.

A more thorough understanding of the invention will be obtained from the following examples:

Example I

An aquagel is first made in the following manner: Fifty-two grams of oil of vitriol of 66° Bé. concentration (93.2% $H_2SO_4$) are added to 500 grams of water, while maintaining the temperature at about 18° C. A solution of sodium silicate containing 29% $SiO_2$ is then diluted with 353 grams of water, and the resulting dilute solution is mixed with the above sulfuric acid solution with agitation and cooling. The solution is then allowed to gel, and the resulting gel is aged until full synaeresis has taken place. After ageing, the synaeresis liquor is removed and the gel is crushed to a 3/4 inch average lump size. The crushed gel is then washed with water until substantially all of the sodium sulfate is removed.

The crushed and washed aquagel prepared in the above manner is covered with 95% ethyl alcohol. This alcohol and water mixture is then drained off after seven hours and replaced with fresh 95% alcohol. This is repeated at intervals of 6 to 8 hours until the drained solvent has a density between 0.819 and 0.822 at 20° C. (about 90% $C_2H_5OH$). The resulting alcogel consists of approximately 13% silica, 78% ethyl alcohol and 9% water.

One hundred and twenty-three grams of alcogel prepared as described above are placed in a porcelain mill which is half full of pebbles. To this is added about 200 cubic centimeters of a lacquer prepared from the following ingredients in the proportions given:

| | Per cent by weight |
|---|---|
| Butyl acetate | 29 |
| Ethyl acetate | 26.4 |
| Toluene | 32.7 |
| Castor oil | 5.6 |
| 1/2" nitrocellulose | 6.3 |

The resulting mixture is ground for about three hours at 72 R. P. M., which results in a smooth stable mass suitable for use as a base grind.

An exceedingly flat finished lacquer is made from the above base grind by diluting or letting down the grind with additional quantities of a lacquer having the above formulation until the mixture or solution has an $SiO_2$ content of about 12% by weight based on the film solids in the entire lacquer solution. The film obtained from this lacquer gives a reading of 4 units when tested on the Hunter Glossmeter.

Example II

An alcogel prepared as described in Example I and composed of 13% silica, 78% ethyl alcohol and 9% water is covered with commercial anhydrous alcohol (99.8%). After about 7 hours the resulting solvent mixture is drained off and replaced with additional anhydrous alcohol. This is repeated at intervals of 6 to 8 hours until the alcohol drained off attains a density of 0.796 at 20° C. (98% $C_2H_5OH$). The resulting alcogel is composed of about 11% silica, 87% alcohol and 2% water.

Six grams of the substantially anhydrous alcogel prepared in the above manner are placed in a porcelain pebble mill. To this is added about 200 cubic centimeters of a lacquer having the following composition:

| | Per cent by weight |
|---|---|
| Ethyl acetate | 15 |
| Butyl acetate | 35 |
| Toluene | 23.6 |
| Rezyl 19 | 13.2 |
| Dibutyl phthalate | 3.9 |
| 1/2" nitrocellulose | 9.3 |

The resulting mixture is ground for about two and a half hours at 72 R. P. M., and constitutes upon completion of the grinding a lacquer having about 3% silica by weight based on the solids in the lacquer. The lacquer thus treated does not settle on standing and forms a very smooth film which gives a reading of 30 units when tested on the Hunter Glossmeter.

Example III

A crushed and washed aquagel prepared as described in Example I is covered with commercial methyl alcohol, and allowed to stand for about seven hours. The liquid is then drained off the gel, and the gel is again flooded with fresh methyl alcohol. This procedure is repeated at intervals of 6 to 8 hours until the solvent drained off has a concentration of 85% $CH_3OH$. The resulting alcogel is composed of about 12% silica, 75% methyl alcohol and 13% water.

One hundred and thirty-two grams of the above alcogel are ground with about 300 cubic centimeters of the following grinding medium:

| | Per cent by weight |
|---|---|
| Ethyl acetate | 20 |
| Butyl acetate | 25 |
| Toluene | 51.6 |
| 60" nitrocellulose | 3.4 |

The resulting mixture or base grind is ground for about three hours at 72 R. P. M., and is then made into a finished lacquer by diluting or letting down with an amyl acetate furniture lacquer until the mixture or solution has an $SiO_2$ content of about 2% by weight based on the film solids present therein. Films formed from the resulting lacquer have a smooth matt surface and give a reading of 50 units when tested on the Hunter Glossmeter.

Example IV

An alcogel having normal propyl alcohol as its continuous phase and composed of about 13% silica, 85% normal propyl alcohol and 2% water is prepared in the manner described in any of the preceding examples. One hundred and twenty-one grams of this gel are ground with about 300 cubic centimeters of the grinding medium described in Example III, which requires about three hours. The resulting base grind is then converted into a finished lacquer by diluting or letting down with a leather lacquer of the following composition:

| | Per cent by weight |
|---|---|
| Ethyl acetate | 10 |
| Butyl acetate | 30 |
| Solvesso No. 1 | 28.5 |
| Paraplex RG2 | 21.5 |
| 6" nitrocellulose | 10.0 | until the mixture or solution has an $SiO_2$ content of about 5% by weight based on the film solids in the finished lacquer. Films formed from the resulting lacquer having a smooth matt surface, and give a reading of 13 units on the Hunter Glossmeter.

Some of the lacquers obtained as described above and in the examples are exceedingly dull in appearance, i. e. low in specular reflection, such as the lacquer prepared according to Example I. These lacquers are admirably adapted for use on the external surfaces of aeroplanes, battleships, and the like to facilitate camouflage, and for similar uses. Other lacquers, such as those described in Examples II, III and IV, are purposely only of moderate flatness, as they are intended primarily for such uses as coating floors, furniture and the like. It is to be understood, however, that regardless of the degree of flatting obtained in any individual lacquer, the flatting agents of this invention are definitely superior in flatting efficiency to any known flatting agent.

Clear lacquers treated in accordance with this invention are free of haziness or milkiness, while pigmented lacquers containing the above described flatting agents retain their original color and color value. Moreover, the films formed therefrom possess substantially the same tensile strength and resistance to brittling as untreated lacquers of otherwise the same composition.

Although reference has been made herein solely to the use of individual alcohols containing from 1 to 3 carbon atoms, it is to be understood that mixtures of these alcohols may be employed, if desired, with equally good results, both in the preparation of the gels and in the flatting efficiency of the resulting gels.

It is also to be understood that when the lacquers of this invention are prepared by first making a base grind and then letting down, the grinding medium of the base grind may have the same composition as the lacquer employed in letting down, or it may have any desired composition which is compatible with the ingredients of the let down solution and is otherwise adapted together with the let down solution to form a satisfactory finished lacquer. The base grind may also be made with any desired concentration of silica which provides satisfactorry grinding conditions.

Although reference has been made in the examples solely to nitrocellulose lacquer compositions, the benefits and advantages of this invention are equally applicable to other types of lacquers, such as cellulose acetate, ethyl cellulose and similar lacquers.

Where reference is made herein to Rezyl 19, Paraplex RG2 and Solvesso No. 1, it is to be understood that Rezyl 19 is an oil-acid modified glyceryl phthalate, Paraplex RG2 is an oil-acid modified glyceryl sebacate, and Solvesso No. 1 is a solvent mixture of petroleum spirits and aromatic spirits, which is derived from petroleum by extraction with liquid $SO_2$ and has a relatively high content (between 50 and 65%) of aromatics, chiefly toluene, an evaporation rate corresponding to that of toluene, and a boiling range of 94 to 139° C.

What I claim is:

1. A flat lacquer composition containing a substance selected from the group consisting of cellulose esters and cellulose ethers and a relatively minor proportion of a silica alcogel.

2. A lacquer composition containing a substance selected from the group consisting of cellulose esters and cellulose ethers and having added thereto a relatively minor proportion of a silica alcogel containing as the continuous phase an alcohol having from 1 to 3 carbon atoms, said lacquer being characterized by forming a flat film upon drying.

3. A lacquer composition containing a substance selected from the group consisting of cellulose esters and cellulose ethers and having added thereto from 1 to 20% by weight of silica based on the solids in said lacquer, said silica having been furnished in the form of an alcogel, said lacquer being characterized by forming a flat film upon drying.

4. A lacquer composition containing a substance selected from the group consisting of cellulose esters and cellulose ethers and having added thereto from 1 to 20% by weight of silica based on the solids in said lacquer, said silica having been furnished in the form of an alcogel having as its continuous phase an alcohol containing from 1 to 3 carbon atoms, said lacquer being characterized by forming a flat film upon drying.

5. A lacquer composition containing a substance selected from the group consisting of cellulose esters and cellulose ethers and having added thereto from 1 to 20% by weight of silica based on the solids in said lacquer, said silica having been furnished in the form of an alcogel containing as the continuous phase at least 80% of an alcohol having from 1 to 3 carbon atoms, said lacquer being characterized by forming a flat film upon drying.

6. A lacquer composition containing a substance selected from the group consisting of cellulose esters and cellulose ethers and having added thereto from 1 to 20% by weight of silica based on the solids in said lacquer, said silica having been furnished in the form of a ground alcogel, said lacquer being characterized by forming a flat film upon drying.

7. A lacquer composition containing a substance selected from the group consisting of cellulose esters and cellulose ethers and having ground therein from 1 to 20% of silica by weight based on the solids in said lacquer, said silica having been furnished in the form of an alcogel containing as the continuous phase an alcohol containing from 1 to 3 carbon atoms.

8. A lacquer composition containing a substance selected from the group consisting of cellulose esters and cellulose ethers and having ground therein from 1 to 20% of silica by weight based on the solids in said lacquer, said silica having been furnished in the form of an alcogel containing as the continuous phase an alcohol of at least 80% concentration containing from 1 to 3 carbon atoms.

9. A lacquer composition containing a substance selected from the group consisting of cellulose esters and cellulose ethers and having ground therein from 1 to 20% of silica by weight based on the solids in said lacquer, said silica having been furnished in the form of an alcogel containing as the continuous phase methyl alcohol of at least 80% concentration.

10. A lacquer composition containing a substance selected from the group consisting of cellulose esters and cellulose ethers and having ground therein from 1 to 20% of silica by weight based on the solids in said lacquer, said silica having been furnished in the form of an alcogel containing as the continuous phase ethyl alcohol of at least 80% concentration.

11. A lacquer composition containing a substance selected from the group consisting of cellulose esters and cellulose ethers and having ground therein from 1 to 20% of silica by weight based on the solids in said lacquer, said silica having been furnished in the form of an alcogel containing as the continuous phase normal propyl alcohol of at least 80% concentration.

12. A lacquer composition containing a substance selected from the group consisting of cellulose esters and cellulose ethers and having added from 1 to 20% by weight of silica based on the solids in said lacquer, said silica having been furnished in the form of an alcogel having as its continuous phase a mixture of alcohols containing from 1 to 3 carbon atoms, said lacquer being characterized by forming a flat film upon drying.

13. The method of flatting lacquers containing a substance selected from the group consisting of cellulose esters and cellulose ethers which comprises grinding into the lacquer an alcogel having as its continuous phase an alcohol of at least 80% concentration containing from 1 to 3 carbon atoms, said alcogel being supplied in sufficient amounts to provide a silica content of from 1 to 20% by weight based on the solids in said lacquer.

14. The method of flatting lacquer containing a substance selected from the group consisting of cellulose esters and cellulose ethers which comprises first forming a base grind by grinding into a solution compatible with said lacquer an alcogel having as its continuous phase an alcohol of at least 80% concentration containing from 1 to 3 carbon atoms, and then letting down the resulting base grind with sufficient of said lacquer to provide a final lacquer solution having an $SiO_2$ content of from 1 to 20% by weight based on the solids in said final lacquer.

15. A flatting composition to be added in relatively small amounts to lacquer compositions of the type containing a substance selected from the group consisting of cellulose esters and cellulose ethers, said flatting composition being capable of imparting a flat finish to a film obtained from said lacquer composition and comprising a ground mixture of a silica alcogel and a liquid vehicle therefor which is compatible with a lacquer solvent.

JOHN J. HEALY, Jr.